United States Patent [19]

Zmolek et al.

[11] Patent Number: 4,483,274
[45] Date of Patent: Nov. 20, 1984

[54] ADJUSTABLE FEEDING UNIT

[75] Inventors: Alfred J. Zmolek; Douglas F. Van Der Voort, both of Elroy, Wis.

[73] Assignee: Merrick Foods, Inc., Middleton, Wis.

[21] Appl. No.: 453,791

[22] Filed: Dec. 27, 1982

[51] Int. Cl.³ ............................................. A01K 5/01
[52] U.S. Cl. ..................................................... 119/61
[58] Field of Search .............................. 119/18, 61, 72

[56] References Cited

U.S. PATENT DOCUMENTS

| | | | |
|---|---|---|---|
| 234,297 | 11/1880 | Lambert | 119/61 X |
| 525,459 | 9/1894 | Hill | 119/61 |
| 1,028,445 | 6/1912 | Dewey | 119/61 |
| 1,610,176 | 12/1926 | Stabler | 119/61 |
| 3,661,121 | 5/1972 | Zielin | 119/61 |

FOREIGN PATENT DOCUMENTS

| | | | |
|---|---|---|---|
| 367954 | 3/1932 | United Kingdom | 119/61 |
| 413409 | 7/1934 | United Kingdom | 119/61 |

Primary Examiner—Robert P. Swiatek
Attorney, Agent, or Firm—Merchant, Gould, Smith, Edell, Welter & Schmidt

[57] ABSTRACT

The present invention is an animal feeding unit (10) having a body (11) with a hollow interior for containing the feed. Access openings (16) for the animal to retrieve feed from the body interior are provided in a front portion (18) of the unit. The feeding angle of the openings (16) is adjustable through a slot and fastener arrangement (28,29,30) provided for mounting the unit. The slot (20) and fastener (29,30) are located in a rear portion (20) of the body (10). The location of the fastener (29,30) within the slot (28) determines the feeding angle of the access openings (16). A backing plate (31) for the slot (28) is provided to prevent loss of feed through the slot (28). The unit may be mounted to a like unit or other structural support by securing the fastener (29) through the slot (28) and a like portion of the second unit or a portion of the other structural support.

8 Claims, 6 Drawing Figures

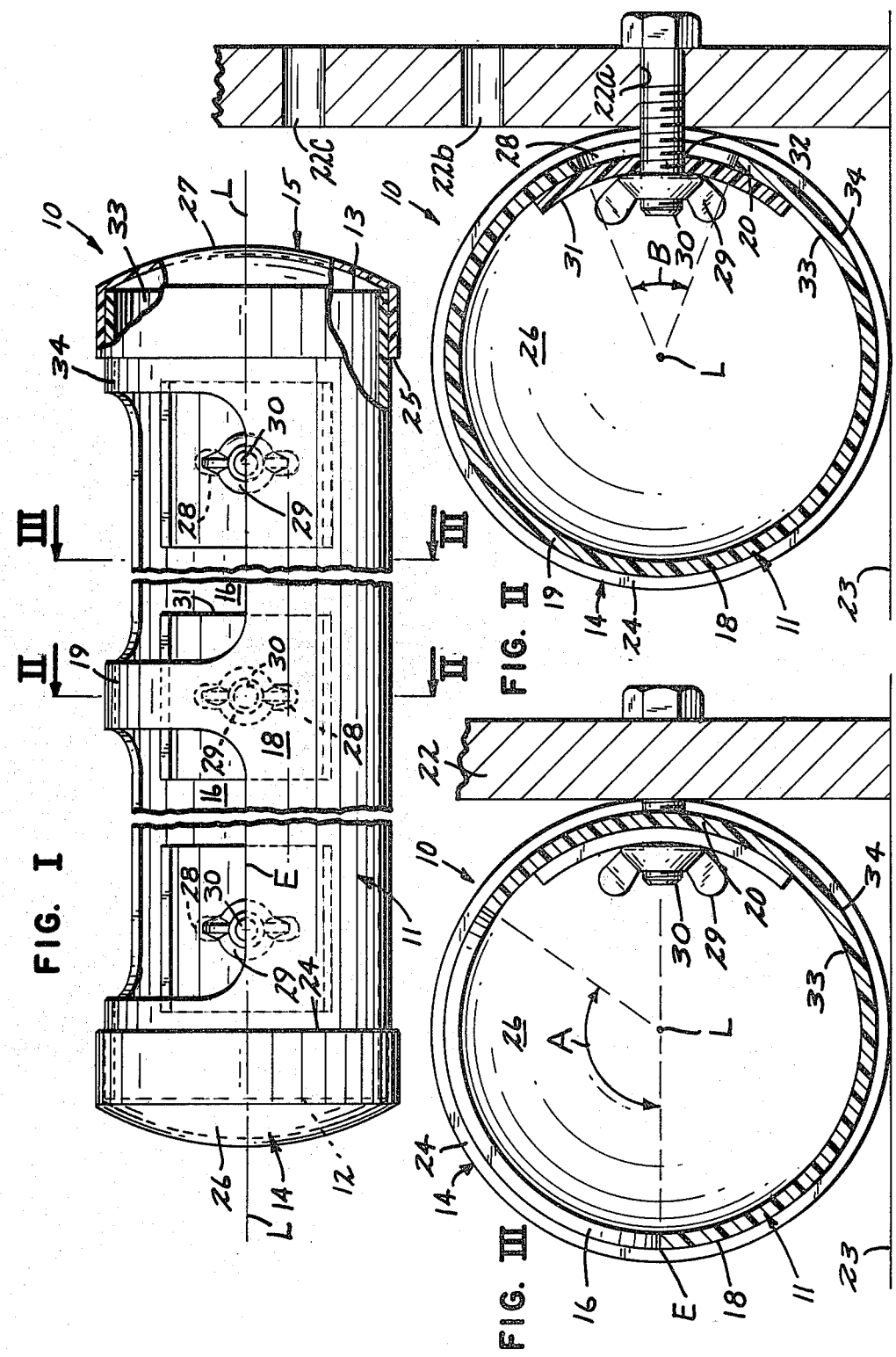

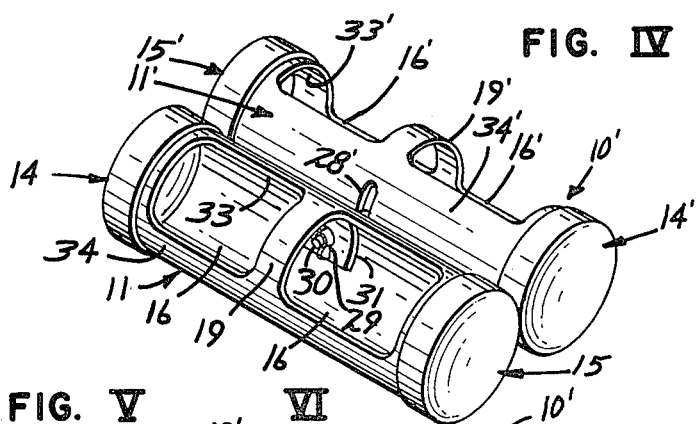
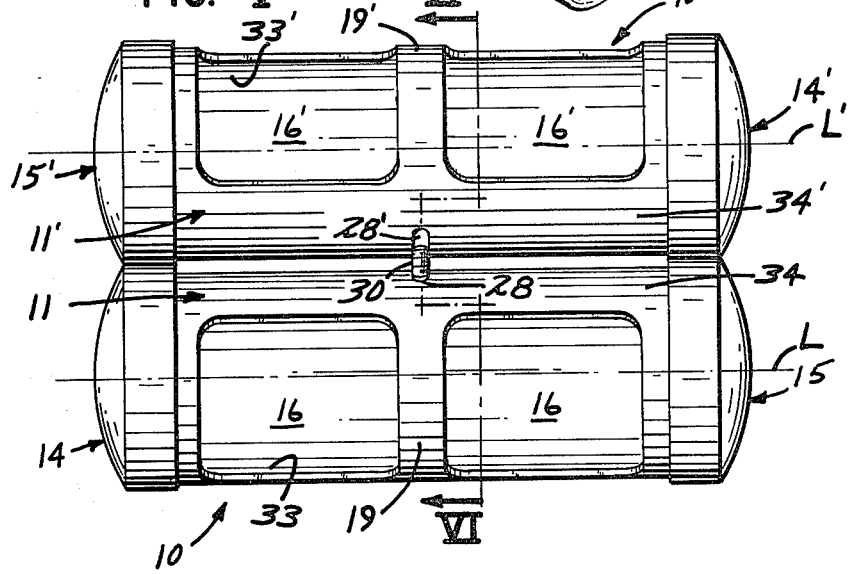
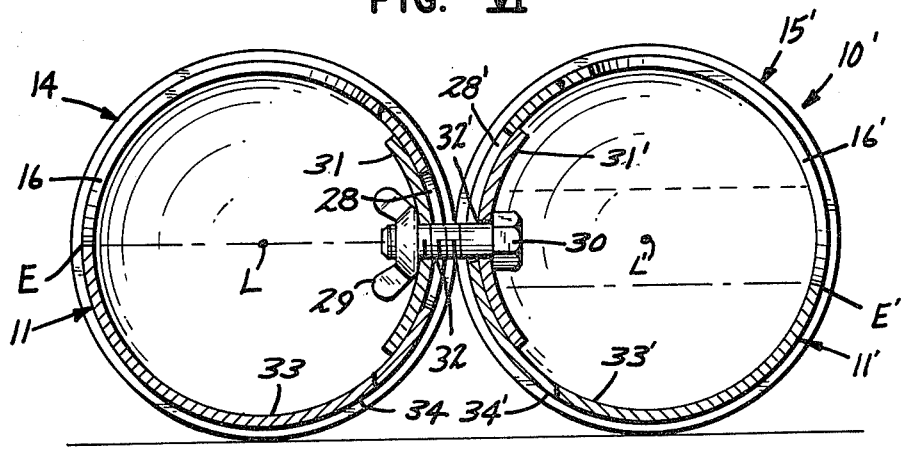

ADJUSTABLE FEEDING UNIT

TECHNICAL FIELD

The present invention relates to feeding units for animals and in particular to a feeding unit which is adjustable to accommodate farm animals, such as pigs, at their different stages of growth.

BACKGROUND

The prior art for animal feeding structures is extensive, but advances in the state of the art continue to be developed to meet the needs of the modern farm producer. Illustrative of the prior art are the following patents: Fechner U.S. Pat. No. 1,118,850 for a "Feed Trough" issued Nov. 24, 1914; Stockton U.S. Pat. No. 1,356,233 for an "Adjustable Feeding and Watering Trough" issued Oct. 19, 1920; Biehl U.S. Pat. No. 3,267,904 for an "Animal Excluding Trough Means" issued Aug. 23, 1966; and, Beihl U.S. Pat. No. 3,359,947 for "Feeding Devices for Animals, More Especially Pigs" issued Dec. 26, 1967.

Much of the recent development, however, has centered around improved mechanization of devices for feeding farm animals efficiently, safely and with a minimum of manual labor being required. Such mechanization has solved significant problems faced by the producers of farm animals, yet the continually changing nature of the methods for raising market animals require new apparatii to carry out the methods in the most efficient manner at the least cost.

Mechanization is expensive and the maintenance of mechanized devices increases a producer's overall operational costs. Oftentimes mechanized devices for feeding animals are not advisable for reasons other than the cost, such as sanitation and safety problems. This is particularly true in the feeding of relatively young farm animals, such as baby piglets. What is required of a feeding unit for baby piglets is that it be easily adjusted as the piglets grow in size. The unit desirably is durable, easily manufactured and of a design which allows several animals access to the feed without any one animal monopolizing the entire unit.

The present invention provides a unique feeding unit which is particularly well-suited to the needs of those farm operators raising pigs from birth. The unit may be economically manufactured from readily available commercial components and assembled with a minimum of skill and labor being required. The design of the unit allows it to be installed and maintained with a mimimum of effort. Also, as the animals grow in size the angle, at which feed contained in the unit is made available to the animals, may be adjusted with a minimum of effort and without requiring any replacement or substitution of one unit for another. Furthermore, no one animal is able to monopolize any one unit because of the construction and arrangement of the access openings to the feed contained therein. The access openings also prevent the animals from rooting the feed out of the unit and from inserting their feet into the feed thus minimizing the spreading of disease.

SUMMARY

The present invention is a unit for feeding animals, especially young pigs. It is constructed for mounting to a separate supporting structure, e.g. a post, or to another feeding unit in a manner which will allow the animals access to feed contained in the unit. Preferably the unit has an elongated, tubular body having a substantially smooth, solid wall defining the hollow interior. The feed is contained by a lowermost trough-like portion of the wall.

In a front portion of the body spaced-apart access openings are provided. Each opening is separated from an adjacent opening by a portion of the solid wall. Each opening is of sufficient size to allow the animal to retrieve the feed from the interior of the unit.

To mount the unit to a supporting structure, e.g. a like unit, a slot and fastener arrangement is provided at the rear portion of the body generally opposite the portion containing the access openings. A fastener, e.g. a bolt, is inserted through a slot in the wall of the body and then secured to a portion of the supporting structure, thereby fixing the feeding angle of the unit in a position relative to the supporting structure.

To adjust the feeding angle of the access openings, the fastener is positioned at various points along the slot thereby causing either an upward tilting or downward tilting of the openings. The adjusted angle is maintained by the fastener being fixed in the slot.

To prevent feed from escaping from the unit through the portions of the slot not occupied by the fastener, a backing plate or seal may be positioned over the slot on the interior surface of the body wall and held there by the same fastener used to mount the unit.

To prevent feed from falling between the supporting structure and the solid rear portion of the unit and becoming wedged therebetween, spacing structure is provided. In the preferred embodiment an end cap is positioned on each end of the body. Each end cap has a wall thickness which spaces the rear portion of the body a pre-selected distance from the supporting structure. The resulting space is large enough to allow any feed, e.g. pellets, falling to the rear of the unit to pass through the space and not become wedged between the unit and the supporting structure.

The construction of the present invention also allows a pair of units to be mounted in back-to-back relationship, thereby providing supporting structure for each other. Furthermore, when mounted back-to-back, the feeding angle at which the openings of each unit is adjusted may be accomplished independently of that of the other unit.

BRIEF DESCRIPTION OF THE DRAWINGS

FIG. I is a view in elevation of the preferred embodiment of the present invention as seen generally from the front;

FIG. II is a view in cross-section of the present invention as seen generally along lines II—II in FIG. I;

FIG. III is a view in cross-section of the present invention as seen generally along lines III—III in FIG. I;

FIG. IV is a view in perspective showing a pair of units, constructed according to the preferred embodiment of the present invention, as mounted in back-to-back relationship;

FIG. V is a top plan view of the present invention shown in FIG. IV; and

FIG. VI is a view in cross-section of the present invention as seen generally along lines VI—VI in FIG. V.

DETAILED DESCRIPTION OF A PREFERRED EMBODIMENT OF THE PRESENT INVENTION

Referring now to the drawings, like reference numerals are used throughout the views to indicate the same aspect of the invention. In FIG. I, a preferred embodiment of the feeding unit is shown as it would appear to an animal facing the front of the unit. The unit has a generally tubular-shaped body 10 made from a durable, commercially available product such as PVC tubing. The surface of the material is preferably smooth.

A solid wall 11 defines the generally circular cross-section of the body 10 and a substantially hollow interior. A lowermost portion of the wall 11 forms a trough-like portion for containing the feed placed into the unit. See FIGS. II and III. The body 10 has a first end 12 and a second end 13. These ends may be formed open or closed depending upon the selection made for the spacing mechanism which will be described below. In the preferred embodiment the ends 12,13 of the body are open with each end being covered by an end cap 14,15 respectively. The end caps may be made from the same material as that of the body.

Feed for the animals is placed into the unit interior and then retrieved by the animals through access openings 16 provided in the front portion 18 of the body 10. In the preferred embodiment a pair of access openings 16 is shown, however, it should be understood that the number of openings in the unit is limited only by the length of the body. Each opening 16 is formed by cutting away a portion of the solid wall of the tubing from which the feed unit is constructed. The shape of the opening may be substantially rectangular and can be appreciated by reference to FIGS. I and III.

Referring now to FIGS. I and III, there extends through the body a longitudinal axis L. The solid wall 11 of the body 10 defines the closed portion of the circumference. Each opening 16 occupies the open portion of the circumference as defined by an arc of between 90 and 180 degrees. In one preferred embodiment an angle A of approximately 120 degrees is selected for the arcuate open portion which forms each access opening 16. In FIG. I the openings are shown as they would appear at one of several feeding angles. In this instance, the openings are tilted back away from an imaginary forward edge E of the unit. The openings 16 are cut a sufficient size to allow the snout of a pig or piglet to be inserted therethrough for access to the feed contained in the feeding unit. Adjacent openings are separated from each other by a strip-like portion 19 of the solid wall 11. This solid wall portion 19 prevents one animal from monopolizing the entire unit by preventing any free movement of an animal's snout between adjacent openings 16.

To further contain the feed within the body when the ends 12,13 are formed open and to provide spacing means between the rear side or portion 20 of the unit and the supporting structure 22, an end cap 14,15 is positioned on the ends of the body to close each end 12,13. Each cap 14,15 may be of conventional construction having an open end 24,25 respectively into which a body end 12,13 is inserted. The inside diameter of the end cap open end 24,25 is only slightly larger than the outside diameter of the body in order that the end cap may be securely held in place on the body 10, but in some instances manually removable. The closed end 26,27 of each end cap 14,15 may have either a flat configuration or may have an arcuate shape as that shown in FIG. I.

In order to secure the feeding unit to another unit or to a separate supporting structure 22, e.g. a fence post or a partition wall, one or more mounting mechanisms are provided in the rear portion 20 of the body 10. In the preferred embodiment, the mounting mechanism also provides for adjusting the relative angular position of the access openings 16, allowing an adjustment of the feeding angle as needed. Each combined mounting and adjusting mechanism includes an oblong slot 28 cut into the rear portion 20 of the solid wall at a location generally opposite the forwardmost edge E of the unit, at a location to the rear of the access openings 16. The slot 28 is cut with the major axis oriented in a direction generally from a top area towards a bottom area of the body 10. Preferably the cut portion defines an arc of less than 90 degrees as indicated by Angle B in FIG. III. The length of the slot 28 determines the angle of adjustment through which the body may be rotated about the longitudinal axis L in altering the feeding angle of the access openings 16 relative to the forward edge E of the unit.

A commercially available fastener 30, such as a nut and bolt assembly, may be used to secure the unit to the supporting structure 22. See FIG. III. The selected fastener 30 must be small enough to extend through the slot 28, yet large enough to securely fix the unit against the supporting structure 22. The fastener 30 is inserted either from the interior of the body outwardly through the supporting structure, or from the supporting structure through the slot into the interior of the body. In either case, on the free extending end of the fastener 30, a locking nut 29 is positioned to prevent movement of the fastener within the slot and relative movement of the unit with respect to the supporting structure.

As the fastener 30 in the preferred embodiment will occupy only a portion of the slot 28 at any given time, it is desirable to prevent leakage of feed from the unit through those portions of the slot 28 not obstructed by the fastener 30. In a preferred embodiment a backing plate or seal 31 having the same radius of curvature as the body wall 11 is provided. The backing plate 31 is sufficiently large to completely overlap the slot 28. A circular opening 32 may be provided in the plate 31, generally in a central location, through which the fastener 30 is inserted in order to secure the plate 31 against the surface 33 of the wall 11. The plate 31 is constructed so that it will lay flush with the wall and it is preferably positioned on the interior surface of the body 10 rather than between the exterior surface 34 of the wall 11 and the supporting structure 22. See FIG. III.

Turning now to FIGS. IV–VI, the mounting of two of the feeding units 10,10' in back-to-back relationship is shown. A common fastener 30 may be used to secure the two units together in a back-to-back relationship. However, as will be explained hereinafter, each unit may be adjusted independently of the other with respect to the feeding angle of its respective access openings 16, 16'.

To use the present invention, an appropriate supporting structure 22, e.g. a wall. Alternatively, a post or another unit may be used as the support. The supporting structure or wall 22 may extend upwardly from a horizontal surface or floor 23. The wall 22 may have a plurality of vertically aligned openings 22a, 22b and 22c which permit selective elevation of the feed body 10 with respect to the floor 23. The unit is lightweight and therefore may be held with one hand while the operator uses the other hand to insert the fastener 30 through the backing plate opening 32, the wall slot 28 and the supporting structure. A nut or similar locking component 29 is then threaded onto the free end of the extending portion of the fastener 30. Before the locking component is turned such that the position of the unit is securely fixed, the operator rotates the body 10 about the longitudinal axis L in either a forward direction or a rearward direction. The distance of this rotation is limited only by the length of the slot 28 as the fastener 30 moves therealong. Once the openings 16 are located at the desired feeding angle, the locking component 29 is finally secured on the fastener 30 thereby securing not only the feeding angle of the access openings, but the position of the unit itself firmly against the supporting structure.

It can be appreciated that the double functioning of the slot 28 and fastener 30 allows a pair of the units to be secured in back-to-back relationship. Additionally, each unit may be individually adjusted for the positioning of its openings relative to the forward edge of the respective unit. See FIG. VI. Thus, one unit 10' may have its access openings in the most forward position possible thereby allowing full access by smaller animals to the feed therein. The other unit 10 may have its access openings rotated to a more upwardly oriented position thereby restricting access to those animals large enough to reach into the top of the unit for the feed therein.

When the unit is used with a supporting structure the spacing mechanism provided by the end caps 14,15 will prevent feed from becoming wedged between the surface of the adjacent supporting structure and the unit. This is desirable in order to maintain a sanitary as well as aesthetically pleasing feeding arrangement. This also avoids any upsetting of the unit by an animal attempting to eat feed which is observable between the units.

The present invention provides a relatively simple construction for an animal feeding unit which has the desirable feature of being adjustable for various feeding angles. It is economical not only to manufacture but to install and maintain. The combination of its several features makes the invention an advance in the state of the art which will be appreciated by those in need of an unit having the capabilities and advantages of the present invention. Of course variations in the preferred embodiment may be made by those skilled in the art.

What is claimed is:

1. An apparatus for feeding animals, said apparatus comprising:

a body having a solid wall defining a generally circular cross-section with a generally hollow interior, said wall defining at least two spaced-apart openings for allowing access by an animal to said interior, said body being tubular in shape and having a first closed end, a second closed end, a front portion and a rear portion, said front portion containing said openings, and said first and second ends including body spacing means for spacing said body apart from the supporting structure a sufficient distance to allow feed to pass therebetween;

securing means in said wall generally opposite said openings for removably mounting said body to a supporting structure, said means including means for adjustably positioning said wall with said openings oriented in selected ones of various positions relative to the supporting structure;

said securing means including a portion of said wall having a slot therein constructed and arranged to receive a fastener for securing said body to the supporting structure and for allowing angular adjustment of said openings relative to the supporting structure, said angular adjustment being determined by the location of said fastener within said slot; and said securing means further including a backing plate constructed and arranged to cover portions of said slot not occupied by said fastener, thereby preventing passage of feed through said slot.

2. The apparatus of claim 1 wherein said spacing means includes a removable end cap positioned on each of said first and second ends, each of said end caps having a thickness sufficient to space said body apart from said supporting structure a sufficient distance to allow feed to pass freely between said body and the supporting structure.

3. An apparatus for feeding animals, said apparatus comprising:

a body having a solid wall defining a generally circular cross-section with a generally hollow interior;

said wall defining at least two spaced-apart openings for allowing access by an animal to said interior;

securing means in said wall generally opposite said openings for removably mounting said body to a supporting structure, said means including means for adjustably positioning said wall with said openings oriented in selected ones of various positions relative to the supporting structure; and said body being secured in back-to-back relationship with a body of a like apparatus with said body being the supporting structure, said positioning means for the respective openings of each of said bodies being independently adjustable with respect to each other.

4. An apparatus for feeding animals which is adapted for mounting to a supporting surface at a height allowing an animal access to feed contained within the apparatus, said apparatus comprising:

a tubular body having a substantially smooth, solid wall, a hollow interior, a first closed end, a second closed end, a front portion, a rear portion and a longitudinal axis extending between said ends;

means in said front portion for allowing an animal limited access to said body interior, said means including a plurality of spaced-apart portions of said solid wall each having an opening therein, said openings being aligned in a row substantially parallel to said axis;

means in said rear portion for removably mounting said body to said supporting surface and for adjusting the angle of said openings relative to the supporting surface, said means including a portion of said wall having a slot therein and a fastener constructed and arranged for insertion through said slot to secure said body to the supporting surface, said fastener being secureable at any point within said slot with the angular adjustment of said openings being determined by the location of said fastener within said slot, said mounting means including means for preventing egress of feed from said body interior through said slot, said means including a backing plate secured by said fastener to said body wall, thereby covering portions of said slot not occupied by said fastener; and means, on at least one of said ends, for spacing said rear portion of said body a sufficient distance apart from the supporting surface to allow feed to pass freely therebetween.

5. The apparatus of claim 4 wherein said spacing means includes a removable end cap positioned on one of said body ends, said end cap having a thickness sufficient to space said rear portion apart from said supporting surface.

6. An apparatus for feeding animals which is adapted for mounting to a supporting surface at a height allowing an animal access to feed contained within the apparatus, said apparatus comprising:

a tubular body having a substantially smooth, solid wall, a hollow interior, a first closed end, a second closed end, a front portion, a rear portion and a longitudinal axis extending between said ends;

means in said front portion for allowing an animal limited access to said body interior, said means including a plurality of spaced-apart portions of said solid wall each having an opening therein, said openings being aligned in a row substantially parallel to said axis;

means in said rear portion for removably mounting said body to said supporting surface and for adjusting the angle of said openings relative to the supporting surface, said means including a portion of said wall having a slot therein and a fastener constructed and arranged for insertion through said slot to secure said body to the supporting surface, said fastener being secureable at any point within said slot with the angular adjustment of said openings being determined by the location of said fastener within said slot;

means, on at least one of said ends, for spacing said rear portion of said body a sufficient distance apart from the supporting surface to allow feed to pass freely therebetween; and said body being mounted in back-to-back relationship with a body of a like apparatus with said bodies being mounted to each other, each of said respective means for adjusting the angle of said respective openings being independent from the operation of said other body angle adjusting means.

7. An apparatus for feeding animals which is adapted for mounting to a separate support at a location allowing the animals access to feed contained in the apparatus, said apparatus comprising:

a tubular body having a smooth, solid wall, a hollow interior defined by said wall, a first closed end, a second closed end, a front portion, a rear portion, a bottom trough-like portion, and a circumference;

means in said front portion for allowing an animal access to feed contained by said trough-like portion, said means including a plurality of spaced-apart wall portions each having an opening therein, said openings being aligned substantially parallel with said axis;

means, in said rear portion opposite said openings, for removably mounting said body to a support and for adjusting the feeding angle of said openings, said means including a fastener and a portion of said wall containing a slot therein extending along said circumference in an arc less than 90 degrees, said slot being constructed to receive said fastener for securement of said body to the support, said fastener being constructed to be positioned at any point along said slot thereby determining the feeding angle at which said openings are positioned;

means for covering said slot portions not occupied by said fastener, said means including a backing plate secured flush against said wall by said fastener in overlapping relation to said slot; and means for spacing said body rear portion apart from the support, said means including an end cap positioned at each end of said body, each of said end caps being constructed and arranged to extend outwardly from said wall a distance sufficient to allow feed to pass freely between said body and the adjacent support.

8. The apparatus of claim 7 wherein said body is mounted in back-to-back relationship with a body of a like apparatus, said bodies being mounted to each other by said fastener, with each of said respective angle adjusting means for said respective openings being independent from the other.

* * * * *